US008199346B2

(12) United States Patent
Morales et al.

(10) Patent No.: US 8,199,346 B2
(45) Date of Patent: Jun. 12, 2012

(54) SYSTEM AND METHOD FOR CONTROLLING PRINTING OF A PRINT JOB IN A PRINTING SYSTEM

(75) Inventors: Javier A Morales, Irondequoit, NY (US); Nicholas P Osadciw, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 641 days.

(21) Appl. No.: 12/177,371

(22) Filed: Jul. 22, 2008

(65) Prior Publication Data

US 2010/0020347 A1  Jan. 28, 2010

(51) Int. Cl.
*G03G 15/00* (2006.01)
*G03G 21/02* (2006.01)
*G06F 3/12* (2006.01)
*H04L 9/00* (2006.01)

(52) U.S. Cl. .................. 358/1.15; 399/9; 399/79; 380/3

(58) Field of Classification Search ................ 380/3, 18, 380/23, 51; 358/1.16, 1.133, 1.15; 399/9, 399/79

See application file for complete search history.

(56) References Cited

U.S. PATENT DOCUMENTS

| | | | |
|---|---|---|---|
| 5,444,779 A * | 8/1995 | Daniele | 399/366 |
| 5,493,634 A | 2/1996 | Bonk et al. | |
| 5,995,721 A | 11/1999 | Rourke et al. | |
| 6,088,550 A * | 7/2000 | Asai et al. | 399/79 |
| 6,407,820 B1 | 6/2002 | Hansen et al. | |
| 6,462,756 B1 | 10/2002 | Hansen et al. | |
| 7,064,848 B2 | 6/2006 | Jackson et al. | |
| 7,092,963 B2 | 8/2006 | Ryan et al. | |
| 2005/0007618 A1 | 1/2005 | Thomason | |
| 2010/0020346 A1 | 1/2010 | Morales et al. | |
| 2010/0020348 A1 | 1/2010 | Morales et al. | |

OTHER PUBLICATIONS

An unofficial file history as of Feb. 1, 2010 of U.S. Appl. No. 12/177,361.
An unofficial file history as of Feb. 1, 2010 of U.S. Appl. No. 12/177,378.
An unofficial prosecution history between Feb. 1, 2010 and Feb. 2, 2011 for U.S. Appl. No. 12/177,361, filed Jul. 22, 2008, published Jan. 28, 2010 as US-2010-0020346-A1; Inventors: Javier A. Morales; Nicholas P. Osadciw.
An unofficial prosecution history between Feb. 1, 2010 and Feb. 17, 2011 for U.S. Appl. No. 12/177,378, filed Jul. 22, 2008, published Jan. 28, 2010 as US-2010-0020348-A1; Inventors: Morales, J.A.; Osadciw; Nicholas P.

* cited by examiner

*Primary Examiner* — Charlotte M Baker
*Assistant Examiner* — Justin Katzwhite

(57) ABSTRACT

A system for controlling printing of a print job in a printing system is provided. In practice, a first value corresponding with a first proposed number of prints to be produced with the printing system is stored in a memory communicating with the controller. When the first value exceeds a number for which copyright clearance is available, a controller changes the first value corresponding with the first proposed number of prints to be produced to a second value corresponding with a second proposed number of prints to be produced. Additionally, when a selected condition is met the controller uses the second value corresponding with the second proposed number of prints to be produced to control the number of prints produced by the printing system.

20 Claims, 2 Drawing Sheets

SYSTEM AND METHOD FOR CONTROLLING PRINTING OF A PRINT JOB IN A PRINTING SYSTEM

CROSS-REFERENCE TO RELATED APPLICATION

Cross reference is made to related U.S. Patent Applications Ser. Nos. 12/177,361 and 12/177,378, each having the same title, the same inventorship and the same filing date of Jul. 22, 2008.

BACKGROUND AND SUMMARY

The disclosed embodiments relate generally to print job management and, more particularly, to a system and method for controlling the printing of a copyright job in a printing system.

Printing systems, including photocopiers, electronic printers, digital copiers, telecopiers, spirit duplicators, and the like, are used to reproduce all types of documents, including documents that should not be reproduced, or whose reproduction should be limited, tracked or controlled. One common example of a potential abuse of printing system is the copying or reprinting of materials subject to copyright. Many governments have updated copyright laws, and worldwide efforts have been underway to develop a means by which authors and publishers can be fairly recompensed for such copying. Non-profit national collectives, for example the Copyright Clearance Center in the United States, also referred to as Reproduction Rights Organizations (RRO's), implement copyright licensing systems and convey royalties to the authors and publishers. The RRO's derive their authority from national legislation, contracts with the authors and publishers, and bilateral agreements with other RRO's.

Current print production copyright management solutions, such as Xerox's FreeFlow Copyright Management Solution ("FreeFlow" is a trademark used by Xerox Corporation), provide mechanisms for obtaining copyright clearances for products, such as course packs, that may require multiple clearances from multiple sources. As indicated above, this may be achieved, in many instances, by obtaining clearance from an automated system such as the Copyright Clearance Center. This clearance may grant a given print shop a license for printing an agreed upon number of copies for a cleared work. Unfortunately, a mechanism for enforcing this license to, for example, avoid production overruns might be completely absent, thus exposing print providers and their customers to possible liability for copyright infringement.

In accordance with one aspect of the disclosed embodiments there is disclosed a system for controlling printing of a print job in a printing system having a plurality of print subsystems, wherein at least a portion of the print job is subject to copyright clearance. The system includes: a controller for controlling operation of the plurality of print subsystems; a memory, communicating with said controller, for storing a first value corresponding with a first proposed number of prints to be produced with the printing system; when the first value exceeds a number for which copyright clearance is available, said controller changes the first value corresponding with the first proposed number of prints to be produced to a second value corresponding with a second proposed number of prints to be produced; and wherein said controller communicates with a copyright clearance authority and when approval is obtained from the copyright clearance authority to produce the second proposed number of prints to be produced said controller uses the second value corresponding with the second proposed number of prints to be produced to control the number of prints produced by the printing system.

In accordance with another aspect of the disclosed embodiments there is disclosed a system for controlling printing of a print job in a printing system having a plurality of print subsystems, wherein at least a portion of the print job is subject to copyright clearance. The system includes: a controller for controlling operation of the plurality of print subsystems; a memory, communicating with said controller, for storing a first value corresponding with a first proposed number of prints to be produced with the printing system; when the first value exceeds a number for which copyright clearance is available, said controller changes the first value corresponding with the first proposed number of prints to be produced to a second value corresponding with a second proposed number of prints to be produced; and when a selected condition is met said controller uses the second value corresponding with the second proposed number of prints to be produced to control the number of prints produced by the printing system.

In accordance with another aspect of the disclosed embodiments there is disclosed a method for controlling printing of a print job in a printing system having a plurality of print subsystems, wherein at least a portion of the print job is subject to copyright clearance. The method includes: controlling operation of the plurality of print subsystems with a controller; storing a first value corresponding with a first proposed number of prints to be produced with the printing system in a memory communicating with the controller; when the first value exceeds a number for which copyright clearance is available, using the controller to change the first value corresponding with the first proposed number of prints to be produced to a second value corresponding with a second proposed number of prints to be produced; and when a selected condition is met, using the second value corresponding with the second proposed number of prints to be produced to control the number of prints produced by the printing system.

DESCRIPTION OF DISCLOSED EMBODIMENTS

Figure 1:
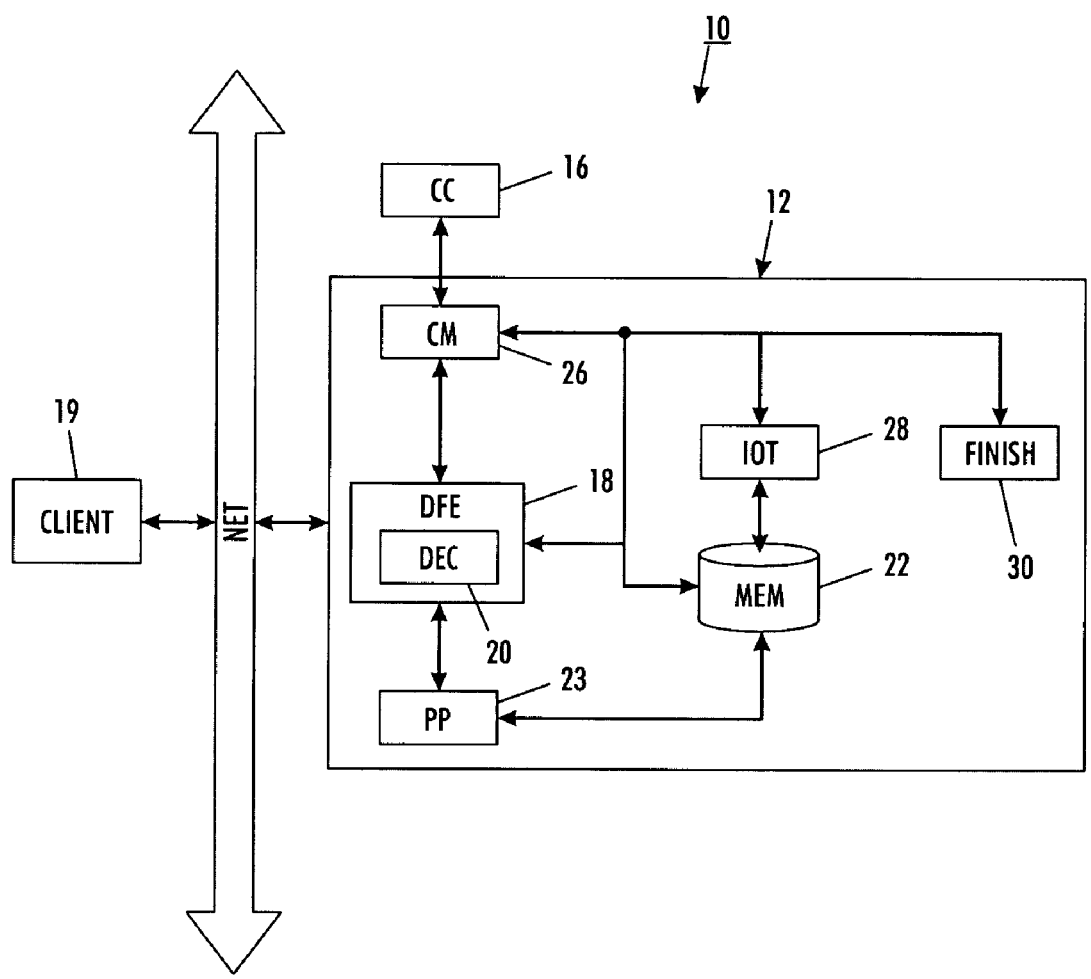
FIG. 1 is a block diagram of a printing system upon which the disclosed copyright job control technique can be employed.

Referring now FIG. 1, a print production platform or system 10 suitable for implementing a copyright control system of the disclosed embodiments is shown. The print production platform includes a printing system 12 communicatively coupled with both a network ("Net") 14 and copyright clearing center ("CC") 16. The printing system includes network controller or digital front end ("DFE") 18 for receiving print jobs from the Net 14. Print jobs may be developed at one of multiple network clients 19 (only one of which is shown in FIG. 1). In one example, the DFE may be comprised of more or more processors, i.e., a job processing platform. A job processing platform suitable for use as a DFE is disclosed in U.S. Pat. No. 5,493,634 to Bonk et al. ("Bonk patent"), the pertinent portions of which are incorporated herein by reference. The DFE includes a decomposer 20 suitable for parsing print jobs into image components, the image components being stored for use in memory 22. The Bonk patent also includes extensive teachings regarding how a print job is captured from a network and then decomposed in anticipation of processing.

As is known a job can be comprised of multiple parts, each of which part can be comprised of copyrighted material. As will appear, the disclosed embodiments are, among other things, particularly adapted to control the printing of multi-part or multi-section jobs in which each part may include copyrighted material for which royalty should be paid. A multi-part job of the type including copyrighted parts will hereinafter be referred to as a "copyright job."

Referring still to FIG. 1, the DFE 18, as illustrated in the Bonk patent functions as the core control for various aspects of the printing system 12. In particular, the DFE may communicate with a prepress ("PP") workflow 23. In practice, the PP workflow may also include an associated processing platform, which associated processing platform may be configured to obtain one or more prepress processing paths. The development of prepress processing paths in the context of print job development is described in, among other references, U.S. Pat. No. 7,064,848 to Jackson et al. and U.S. Pat. No. 6,407,820 to Hansen et al., the pertinent portions of which patents are incorporated herein by reference. The DFE 18 also communicates with a copyright clearance manager ("CCM") 26, the significance of which will appear below. A detailed description of one type of copyright clearance manager is disclosed in U.S. Pat. No. 5,444,779 to Daniele, the pertinent portions of which are incorporated herein by reference. Xerox Corporation sells a print system control arrangement including a copyright clearance manager, the arrangement being referred to as "FreeFlow" ("FreeFlow" is a trademark of Xerox Corporation).

As further illustrated in FIG. 1, the DFE 18 also communicates with an image output terminal (IOT) 28 and a finishing arrangement 30. One example illustrating how a controller operates with an IOT and memory to process a print job, and thus produce prints from stored image components, is provided in the above-mentioned Bonk patent. Another example illustrating how the print job output can be finished is disclosed in U.S. Pat. No. 7,092,963 B2 to Ryan et al., the pertinent portions of which are disclosed herein by reference. It will be understood by those skilled in the art that the IOT 28 could include multiple print queues and could thus support multiple printers. An example of a distributed printing arrangement suitable for use with the disclosed embodiments is described in U.S. Pat. No. 5,995,721 to Rourke et al., the pertinent portions of which are incorporated herein by reference.

Some of the underlying principles of the copyright control system of the disclosed embodiments can be understood by reference to the following overview. An upstream order entry system (possibly at client 19 of FIG. 1) might enable print shop customers to select content for production. In educational environments, for instance, this might include a course pack made up of selected portions of other works. A course pack might include chapters 3 and 6 from one book, chapters 1-4 of another book, and so on. This sort of approach can be effective as an alternative to asking students to purchase many books from which only a few chapters will be used in class.

The upstream system would, via a print job, submit the requests for specific course packs to the printing system 12 (FIG. 1). These requests could then be parsed out by the decomposer 20 and passed on to the CM 26. In essence, the print production system would gather the content for each course pack and determine (via CM 26) any required copyright clearances. The clearances (which might be for a certain number of sets at a given price) would, under ideal circumstances be obtained from a system such as the CC 16. As will appear, ideal circumstances do not always exist, and the disclosed embodiments advantageously accommodate for those circumstances in which clearances cannot be obtained immediately (or possibly not at all).

After the clearance information is obtained, the system would store the clearance information at a central location (such as memory 22) that could be used by system modules or workflow components to determine copyright clearance restrictions. This system could also use concepts underlying dynamic loadable modules to further enhance functionality. As with some other existing products, the approach of the disclosed embodiments could track permissions at the page level. This would permit a publisher to grant copyright clearance for less than the desired number of copies. Also, publishers might wish to grant different copyright clearances for portions of a document, depending on source origin. As will appear, the disclosed embodiments advantageously enforce an aggregated clearance for an overall "document" (including, for instance, a document with multiple sections).

For those instances in which clearances are granted for less than the requested or desired amount, the system may apprise a system operator that clearance for the requested number of sets (job components in question) is currently unavailable. Under these circumstances, some of the following alternatives may exist:

a. The operator may attempt to obtain clearance through manual means. If clearance for additional copies is granted and the copyright granting system is updated, the operator may initiate a clearance update from the CM 26 (FIG. 1) for the job components in question.

b. The operator may simply choose to produce only those sets for which copyright clearance has been granted.

c. The system may be configured to drop the sections for which copyright clearance could not be obtained. This might be implemented manually or in an automated fashion based on a determination made by the operator. This determination might be performed either during prepress or at print time by suppressing printing of certain pages. Performing this operation at print time would enable the system to perform the required prepress without concerns about copyright clearance.

d. In other cases, the CM 26 may register a "pending clearance," in which case a print job author might need to obtain copyright clearance from an owner for any job components that might be in question.

In order to facilitate production, the system can begin performing automated prepress operations on the jobs as they are ordered so prepress operations can be performed while the copyright clearance issues are being resolved. After prepress, jobs are may be routed to either an output management system (e.g., IOT 28 in FIG. 1) or directly to the DFE 18. In either case, before permitting initiation of printing a given print job, the DFE would ensure that all necessary copyright permissions have been obtained for that given job. Jobs that do not have all copyright permissions in order may be held by the system until notification is received. In one example of operation, CM 26 tracks which jobs are waiting for copyright clearance at which printing or finishing related devices. When the clearances are obtained, the DFE 18 or CM 26 can notify those devices that the job is ready for production. The automated prepress system (PP 23) could be programmed (with, for instance, the DFE) to refuse to export, print, or in any way send an un-cleared job to a system that has not been copyright management enabled.

Referring to FIG. 1, in one contemplated approach the DFE 18 would ensure that only the prescribed sets of the work are printed. Accordingly, the DFE might refuse to execute any operations that could result in additional copies of the work being printed. That would include, for example, job forwarding and saving in formats that did not support copyright permission. Additionally, after a given job is printed, the DFE 18 could return information about the actual number of sets created to CM 26 so that this information could be used for printing of additional sets at a later time.

In cases where all or part of a job is sent to multiple printers, (for the sake of, for example, load balancing or color splitting) the system that divides the job could determine how the copyright clearances should be divided as well. Each printer would then possess the capability to enforce its print allocation, thus ensuring overall compliance with the copyright clearance.

Figure 2:
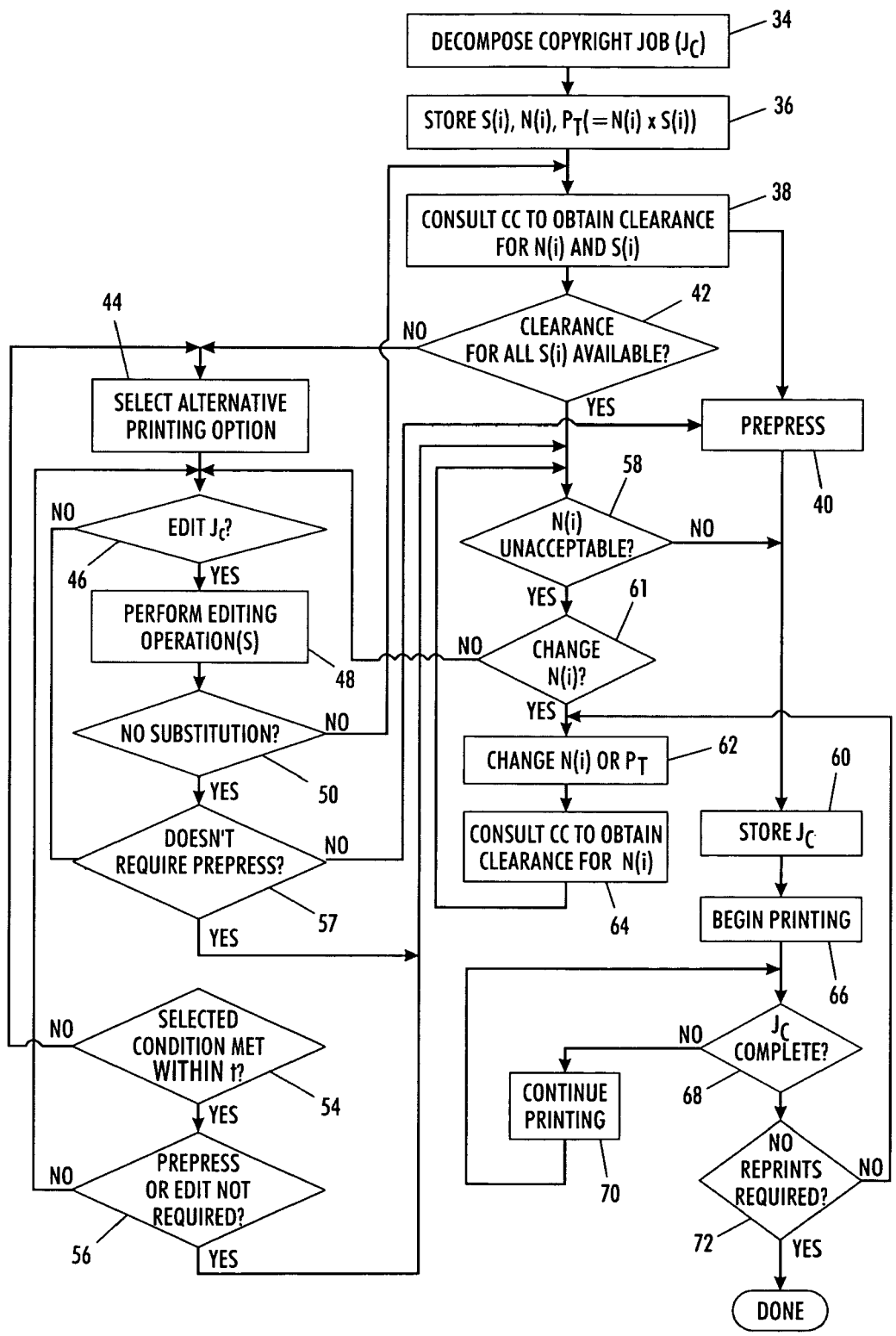
FIG. 2 is a flow diagram illustrating some of the functionality associated with the disclosed copyright job control technique.

Referring now to FIG. 2 (in conjunction with FIG. 1), an exemplary implementation for use with the production platform of FIG. 1 is shown. Initially (at 34) a job including one or more copyrighted portions (referred to below as copyright job or "$J_C$") is parsed with DEC 20 to obtain page and job level information. Then, at 36, information about the number of sets to be printed (N(i)) and each block of pages corresponding with a job section (S(i)) is stored in MEM 22. As noted at 36, "$P_T$" corresponds with a total number of intended prints or [N(i)×S(i)].

As contemplated by 38, CM 26 knows the values of N(i) as well as the number of pages for and origin of each S(i). It should be appreciated that the number of sets associated with each S(i) could vary so that, for example, a job with S(1) and S(2) could be characterized by N(1)×S(1) and N(2)×S(2) where N(1) is greater or less than N(2). As the process proceeds from 38 (to determine if copyright clearance is available for each S(i)) any part of $J_C$ requiring one or more prepress operations can, via 40, be sent to PP 23 (FIG. 1). In this way, prepress operations can be performed relative to $J_C$ in parallel with obtaining copyright clearance for one or more of S(i). At 42, CM, in view of its consultation with CC 16 at 38, determines whether copyright clearance is available for each S(i).

The implementation illustrated by the flow chart of FIG. 2 contemplates at least two branches of copyright job assessment, namely a first branch where some action is taken to accommodate for lack of clearance for at least one of S(i), and a second branch where action is taken to accommodate for possible lack of clearance with respect to $P_T$. Based on a NO answer to the determination of 42, an alternative printing option, of the type described above, is selected at 44. In one example, the functionality underlying 44 is controlled by a set of rules. For instance, as will appear, one rule may recommend editing $J_C$ when clearance for one of S(i) is unavailable. Yet another rule associated with the editing rule may promote substitution with respect to the one of S(i) for which clearance is unavailable. In yet another instance, a rule may be used in setting a time (t) that the system should wait on a clearance, and what action should be taken when the clearance is found to be unavailable.

As just alluded to above, one of the alternative printing options might include editing $J_C$ (46 [YES answer] and 48). Editing of $J_C$ may include, among other things, deleting one of S(i) or substituting a new section for one or more of S(i). In one example, the substitution might be suggested by the developer(s) of $J_C$. If the editing includes a substitution (causing a NO answer to 50), then the process loops back to 38 so clearance can be obtained for the edited $J_C$. For those instances in which prepress operations are not performed on $J_C$ in parallel with obtaining copyright clearance for one or more of S(i), prepress operations may be performed after editing (YES answer to 50).

If no editing is performed on $J_C$ as a result of receiving a NO answer at 46, the process proceeds to 54 to determine if a selected condition (e.g., clearance for one or more of S(i) has become available) has been met within a given time interval t. If the selected condition has not been met within t, then the process may return to 44 for selection of another printing option. In accordance with the description above, this selection may be facilitated through use of a set of predefined rules. In one example, only the sections that have been cleared are considered for printing, while in yet another example, $J_C$ may be faulted.

If the selected condition has been met within t, then the process proceeds to 56 for determining if any further editing or prepress operation needs to be performed on $J_C$. When further editing or prepress operation is required, the process loops back to 46 where prepress may be initiated with a NO answer from 57; otherwise the process proceeds to the second branch (starting with 58).

The second branch may accommodate for, among other things, situations in which clearance for each of S(i) is available, but clearance or permission to print a proposed number of sets N(i) for one or more of S(i) is not. The second branch may also accommodate for situations in which N(i) is unacceptable because the royalty resulting from use of N(i) drives cost for $J_C$ above a level desired by an owner of $J_C$. If the value of N(i) is acceptable, then the process stores $J_C$ (in anticipation of printing) at 60. If the value of N(i) is unacceptable (because, for instance, the copyright owner will not grant permission to print N(i) sets for part or all of $J_C$, or use of N(i) would result in an unacceptable royalty), a check may be performed at 61 to determine if N(i) should be changed. If N(i) is unacceptable because its use would result in unacceptable royalty, then either N(i) can be changed or $J_C$ edited [e.g., an alternate section(s) substituted for S(i)]. In the event editing (possibly substitution) is desired, the process is directed to 46. In this way, any editing can be cleared with 42, if necessary.

In the event N(i) is unacceptable because N(i) cannot be cleared with CC 16 (FIG. 1), the value(s) of N(i) (or the value of $P_T$) may be selectively changed or adjusted at 62. More particularly, as indicated above, N(i) may vary from print set to print set. In one example, it may be that proposed N(i) for a first print set need not be adjusted (because copyright clearance for N(i) of the first print set is available for the proposed N(i)), while N(i) for a second print set requires adjustment downward because copyright clearance is not available for the N(i) proposed for the second print set. Responsive to the adjustment at 62, CC 16 (FIG. 1) may be consulted at 64 to obtain clearance for the adjusted value(s) of N(i). If N(i) is now acceptable (58) (possibly because either suitable copyright clearance has been obtained from CC 16 or the resulting royalty is now within an acceptable range), then the process proceeds to 60; otherwise, another adjustment can be made at 62 and CC consulted again (64).

Referring still to FIG. 2, at a selected time (66), printing of $J_C$ begins. As printing of $J_C$ proceeds, a check is performed at 68 to determine if printing of $J_C$ is complete, that is whether the number of prints processed is now equal to a value of $P_T$ for $J_C$. As should appear from the description above, the value of $P_T$ used for printing is obtained with acceptable or approved values for N(i) and S(i). Accordingly, the value of $P_T$ used for printing may be less than the $P_T$ originally requested for $J_C$. Printing will continue (70) until the number of prints equals the value of $P_T$ currently set for $J_C$. As indicated above, in one contemplated approach, further printing for $J_C$ is prohibited by, for instance the DFE 18 (FIG. 1) until clearance for S(i) and/or N(i) have been obtained. Indeed, it may be desirable, in one instance to partition $J_C$ into two jobs with one being a cleared job ready for printing and another job awaiting suitable copyright clearance.

Referring still to FIG. 2, responsive to obtaining a YES to 68, it may be desirable to determine whether reprints might be required. One way to achieve this is to check at 72 for unsuitable output in the printing system 12. In one example, a number of unsuitable prints might be detected at the output of Finish 30 (FIG. 1) and the number of unsuitable prints communicated back to DFE 18 through one of several workflow arrangements (using, among other things, JDF), such as one of the workflows disclosed in U.S. Pat. No. 6,462,756 B1 to Hansen et al. or U.S. Pat. No. 7,092,963 B2 to Ryan et al, the pertinent portions of which are incorporated by reference. It will be appreciated by those skilled in the art that unsuitable output might be encountered at several points other than finishing. For instance, unsuitable output could be obtained as a result mis-marked prints at IOT 28 (FIG. 1).

The above-described system and method relate to an approach in which a first value corresponding with a first proposed number of prints to be produced with a printing system is stored in memory. When the first value exceeds a number for which copyright clearance is available, a controller changes the first value corresponding with the first proposed number of prints to be produced to a second value corresponding with a second proposed number of prints to be produced. Additionally, when a selected condition is met the controller uses the second value corresponding with the second proposed number of prints to be produced to control the number of prints produced by the printing system.

In a first example, the first proposed number of prints to be produced varies, in part, as a function of a first proposed number of print sets to be produced with the printing system, wherein the controller determines the first proposed number of print sets to be produced exceeds an approved number of print sets for which copyright clearance has been obtained, and wherein, responsive to said determining, the controller reduces the first proposed number of print sets to be produced to a second proposed number of print sets to be produced with the printing system.

In a second example, the first proposed number of prints to be produced varies, in part, as a function of a first proposed number of print sets to be produced with the printing system and a second proposed number of print sets to be produced with the printing system, wherein the controller determines one of the first proposed number of print sets to be produced and the second proposed number of print sets to be produced exceeds an approved number of print sets for which copyright clearance has been obtained, and wherein, responsive to said determining, the controller reduces the one of the first proposed number of print sets to be produced and the second proposed number of print sets to be produced to a third proposed number of print sets to be produced with the printing system.

In a third example, the first proposed number of prints to be produced varies, in part, as a function a first proposed number of print sets to be produced with the printing system and a second proposed number of print sets to be produced with the printing system, wherein the controller determines at least one of the first proposed number of print sets to be produced and the second proposed number of print sets to be produced exceeds an approved number of print sets for which copyright clearance has been obtained, and wherein, responsive to said determining, the controller reduces each of the first proposed number of print sets to be produced and the second proposed number of print sets to be produced to a third proposed number of print sets to be produced.

In the second and third examples above, the first proposed number of prints to be produced may be equal to the second proposed number of prints to be produced.

In a fourth example, the printing system is requested to produce one or more prints in addition to the second proposed number of prints to be produced, wherein the controller automatically prohibits printing of said one or more prints.

In a fifth example, the controller communicates with a copyright clearance subsystem, wherein the selected condition referred to above includes obtaining approval from the copyright clearance subsystem to produce the second proposed number of prints to be produced.

The above-described system may include a prepress subsystem, and a portion of the print job may be processed in parallel with either the controller (a) changing the first value corresponding with the first proposed number of prints to be produced to the second value corresponding with the second proposed number of prints to be produced, or (b) using the second value corresponding with the second proposed number of prints to be produced to control the number of prints produced by the printing system.

In a sixth example, the print job includes a first section and a second section both of which are stored in said memory, wherein the above-mentioned selected condition is met when copyright clearance is obtained for at least one of the first and second sections.

In a seventh example, the print job includes a first section and a second section both of which are stored in said memory, wherein the selected condition is met when a third section is substituted for one of the first and second sections and copyright clearance is obtained for the third section.

In an eighth example, at least one of the prints produced by the printing system comprises unsuitable output (which may result from finishing), wherein the controller causes the printing system to produce prints for replacing the unsuitable output.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A system for controlling printing of a print job in a printing system having a plurality of print subsystems, wherein at least a portion of the print job is subject to copyright clearance, comprising:
   a controller for controlling operation of the plurality of print subsystems; and
   a memory, communicating with said controller, for storing a first value corresponding with a first proposed number of prints to be produced with the printing system;

said controller, when the first value exceeds a number for which copyright clearance is available, changing the first value corresponding with the first proposed number of prints to be produced to a second value corresponding with a second proposed number of prints to be produced;

said controller communicating with a copyright clearance authority;

said controller, when approval is obtained from the copyright clearance authority to produce the second proposed number of prints to be produced, using the second value corresponding with the second proposed number of prints to be produced to control the number of prints produced by the printing system.

2. A system for controlling printing of a print job in a printing system having a plurality of print subsystems, wherein at least a portion of the print job is subject to copyright clearance, comprising:

a controller for controlling operation of the plurality of print subsystems; and a memory, communicating with said controller, for storing a first value corresponding with a first proposed number of prints to be produced with the printing system;

said controller, when the first value exceeds a number for which copyright clearance is available, changing the first value corresponding with the first proposed number of prints to be produced to a second value corresponding with a second proposed number of prints to be produced;

said controller, when a selected condition is met, using the second value corresponding with the second proposed number of prints to be produced to control the number of prints produced by the printing system.

3. The system of claim 2, in which the first proposed number of prints to be produced varies, in part, as a function of a first proposed number of print sets to be produced with the printing system, wherein said controller determines the first proposed number of print sets to be produced exceeds an approved number of print sets for which copyright clearance has been obtained, and wherein, responsive to said determining, said controller reduces the first proposed number of print sets to be produced to a second proposed number of print sets to be produced with the printing system.

4. The system of claim 2, in which the first proposed number of prints to be produced varies, in part, as a function of a first proposed number of print sets to be produced with the printing system and a second proposed number of print sets to be produced with the printing system, wherein said controller determines one of the first proposed number of print sets to be produced and the second proposed number of print sets to be produced exceeds an approved number of print sets for which copyright clearance has been obtained, and wherein, responsive to said determining, said controller reduces the one of the first proposed number of print sets to be produced and the second proposed number of print sets to be produced to a third proposed number of print sets to be produced with the printing system.

5. The system of claim 4, wherein the first proposed number of prints to be produced is equal to the second proposed number of prints to be produced.

6. The system of claim 2, in which the first proposed number of prints to be produced varies, in part, as a function a first proposed number of print sets to be produced with the printing system and a second proposed number of print sets to be produced with the printing system, wherein said controller determines at least one of the first proposed number of print sets to be produced and the second proposed number of print sets to be produced exceeds an approved number of print sets for which copyright clearance has been obtained, and wherein, responsive to said determining, said controller reduces each of the first proposed number of print sets to be produced and the second proposed number of print sets to be produced to a third proposed number of print sets to be produced.

7. The system of claim 6, wherein the first proposed number of prints to be produced is equal to the second proposed number of prints to be produced.

8. The system of claim 2, in which the printing system is requested to produce one or more prints in addition to the second proposed number of prints to be produced, wherein said controller automatically prohibits printing of said one or more prints.

9. The system of claim 2, further comprising a prepress subsystem, wherein at least a portion of the print job is processed in parallel with said (C) or (D).

10. The system of claim 2, in which the print job includes a first section and a second section both of which are stored in said memory, wherein the selected condition is met when copyright clearance is obtained for at least one of the first and second sections.

11. The system of claim 2, in which the print job includes a first section and a second section both of which are stored in said memory, wherein the selected condition is met when a third section is substituted for one of the first and second sections and copyright clearance is obtained for the third section.

12. The system of claim 2, in which at least one of the prints produced by the printing system comprises unsuitable output, wherein said controller causes the printing system to produce prints for replacing the unsuitable output.

13. The system of claim 12, wherein at least some of the unsuitable output is from a finishing device.

14. A method for controlling printing of a print job in a printing system having a plurality of print subsystems, wherein at least a portion of the print job is subject to copyright clearance, comprising:

controlling operation of the plurality of print subsystems with a controller;

storing a first value corresponding with a first proposed number of prints to be produced with the printing system in a memory communicating with the controller;

when the first value exceeds a number for which copyright clearance is available, using the controller, changing the first value corresponding with the first proposed number of prints to be produced to a second value corresponding with a second proposed number of prints to be produced; and when a selected condition is met, using the second value corresponding with the second proposed number of prints to be produced to control the number of prints produced by the printing system.

15. The method of claim 14, in which the first proposed number of prints to be produced varies, in part, as a function a first proposed number of print sets to be produced with the printing system, further comprising determining the first proposed number of print sets to be produced exceeds an approved number of print sets for which copyright clearance has been obtained, and wherein, responsive to said determining, the first proposed number of print sets to be produced is reduced to a second proposed number of print sets to be produced with the printing system.

16. The method of claim 14, in which the first proposed number of prints to be produced varies, in part, as a function a first proposed number of print sets to be produced with the printing system and a second proposed number of print sets to be produced with the printing system, further comprising determining one of the first proposed number of print sets to be produced and the second proposed number of print sets to be produced exceeds an approved number of print sets for which copyright clearance has been obtained, and responsive to said determining, the one of the first proposed number of print sets to be produced and the second proposed number of print sets to be produced is reduced to a third proposed number of print sets to be produced with the printing system.

17. The method of claim 14, in which the first proposed number of prints to be produced varies, in part, as a function a first proposed number of print sets to be produced with the printing system and a second proposed number of print sets to be produced with the printing system, further comprising at least one of the first proposed number of print sets to be produced and the second proposed number of print sets to be produced exceeds an approved number of print sets for which copyright clearance has been obtained, and, responsive to said determining, each of the first proposed number of print sets to be produced and the second proposed number of print sets to be produced is reduced to a third proposed number of print sets to be produced.

18. The method of claim 14, in which the printing system is requested to produce one or more prints in addition to the second proposed number of prints to be produced, further comprising:

automatically prohibiting printing of said one or more prints.

19. The method of claim 14, wherein the selected condition includes obtaining approval from a copyright clearance subsystem to produce the second proposed number of prints to be produced.

20. The method of claim 14, in which at least one of the prints produced by the printing system comprises unsuitable output, further comprising:

causing the printing system to produce prints for replacing the unsuitable output.

* * * * *